(12) United States Patent
Yin et al.

(10) Patent No.: US 10,929,109 B2
(45) Date of Patent: Feb. 23, 2021

(54) METHOD AND APPARATUS FOR CONVERTING BUILDING BLOCK PROGRAMMING INTO PROGRAM CODE

(71) Applicant: MAKEBLOCK CO., LTD., Guangdong (CN)

(72) Inventors: Jun Yin, Guangdong (CN); Yu Wang, Guangdong (CN)

(73) Assignee: MAKEBLOCK CO., LTD., Guangdong (CN)

( * ) Notice: Subject to any disclaimer, the term of this patent is extended or adjusted under 35 U.S.C. 154(b) by 23 days.

(21) Appl. No.: 16/315,203

(22) PCT Filed: May 16, 2017

(86) PCT No.: PCT/CN2017/084533
§ 371 (c)(1),
(2) Date: Jan. 4, 2019

(87) PCT Pub. No.: WO2018/209558
PCT Pub. Date: Nov. 22, 2018

(65) Prior Publication Data
US 2020/0183662 A1  Jun. 11, 2020

(51) Int. Cl.
*G06F 9/44* (2018.01)
*G06F 8/36* (2018.01)
*G06F 8/51* (2018.01)

(52) U.S. Cl.
CPC . *G06F 8/36* (2013.01); *G06F 8/51* (2013.01)

(58) Field of Classification Search
CPC ....................................................... G06F 8/34
(Continued)

(56) References Cited

U.S. PATENT DOCUMENTS 6,216,261 B1 *  4/2001  Mitchell ................... G06F 8/34
717/107
7,900,188 B2    3/2011  Costa et al.
(Continued)

FOREIGN PATENT DOCUMENTS

CN     102163149 A    8/2011
CN     103197929 A    7/2013
(Continued)

OTHER PUBLICATIONS

Giuseppe Attardi et al.; "CodeBricks: Code Fragments as Building Blocks"; PEPM'03, Jun. 7, 2003, San Diego, California, USA.*
(Continued)

*Primary Examiner* — Francisco J Aponte
(74) *Attorney, Agent, or Firm* — Alston & Bird LLP

(57) ABSTRACT

The present invention provides a method and apparatus for converting building block programming into a program code. The method comprises: setting up building blocks including input parameters, wherein the building blocks mean statement units in the building block programming; setting up a configuration file for converting the building blocks into program codes, wherein the configuration file comprises a plurality of code regions and subprogram codes respectively set up in the plurality of code regions; and converting the building blocks into corresponding program codes according to the subprogram codes and the input parameters respectively set up in the plurality of code regions. The problem in the prior art that the building block programming cannot be applied to different electronic modules is solved.

15 Claims, 4 Drawing Sheets

(58) Field of Classification Search
USPC .................................................. 717/106
See application file for complete search history.

(56) References Cited

U.S. PATENT DOCUMENTS

| | | | | | |
|---|---|---|---|---|---|
| 8,042,093 | B1* | 10/2011 | Ogami | ............... | G06F 8/36 717/109 |
| 8,296,723 | B2* | 10/2012 | Hanner | ............... | G06F 8/30 717/101 |
| 8,752,015 | B2* | 6/2014 | Basak | ............... | G06F 9/44505 717/120 |
| 9,098,294 | B2* | 8/2015 | Zavatone | ............... | G06F 16/907 |
| 9,195,440 | B2* | 11/2015 | Adams | ............... | G06F 8/36 |
| 9,304,744 | B2* | 4/2016 | Repenning | ............... | G06F 8/20 |
| 9,383,974 | B2* | 7/2016 | Huin | ............... | G06F 8/34 |
| 9,497,572 | B2* | 11/2016 | Britt | ............... | G06F 8/36 |
| 9,619,211 | B2* | 4/2017 | McCollum | ............... | G06F 8/33 |
| 9,652,203 | B1* | 5/2017 | Haq | ............... | G06F 3/04842 |
| 10,001,974 | B1* | 6/2018 | Hayen | ............... | G06F 8/36 |
| 10,019,238 | B2* | 7/2018 | Patino-Bueno | ............... | G06F 8/20 |
| 10,713,016 | B1* | 7/2020 | Shah | ............... | G06F 3/0482 |
| 10,732,939 | B2* | 8/2020 | Khoyi | ............... | G06F 3/04847 |
| 2003/0221184 | A1* | 11/2003 | Gunjal | ............... | G06F 8/24 717/118 |
| 2006/0144010 | A1* | 7/2006 | Wolf | ............... | G06F 8/20 52/750 |
| 2007/0006188 | A1* | 1/2007 | Schroth | ............... | G06F 8/447 717/140 |
| 2012/0266063 | A1* | 10/2012 | Bushnell | ............... | G06Q 50/08 715/255 |
| 2014/0059512 | A1* | 2/2014 | Brown | ............... | G06F 8/00 717/100 |
| 2014/0282227 | A1* | 9/2014 | Nixon | ............... | G06F 3/04855 715/786 |
| 2014/0282367 | A1* | 9/2014 | Harrill | ............... | G06F 8/31 717/105 |
| 2015/0261506 | A1* | 9/2015 | Torgemane | ............... | H04N 21/482 717/107 |
| 2016/0011905 | A1* | 1/2016 | Mishra | ............... | G06Q 10/06 718/102 |
| 2016/0093232 | A1* | 3/2016 | Chong | ............... | G09B 19/06 434/118 |
| 2016/0124720 | A1* | 5/2016 | Beckwith | ............... | G06F 8/33 717/113 |
| 2016/0283199 | A1* | 9/2016 | High | ............... | G06F 8/34 |
| 2016/0378437 | A1* | 12/2016 | Patino-Bueno | ............... | G06F 8/20 717/105 |
| 2017/0315786 | A1* | 11/2017 | Rogers | ............... | G06F 8/38 |
| 2017/0371629 | A1* | 12/2017 | Chacko | ............... | G06F 8/36 |
| 2018/0081639 | A1* | 3/2018 | Collins | ............... | G06F 8/36 |
| 2018/0285084 | A1* | 10/2018 | Mimlitch, III | ............... | G06F 8/33 |
| 2019/0095178 | A1 | 3/2019 | Chun | | |

FOREIGN PATENT DOCUMENTS

| | | |
|---|---|---|
| CN | 103552071 A | 2/2014 |
| CN | 103677763 A | 3/2014 |
| CN | 104503754 A | 4/2015 |
| CN | 105607902 A | 5/2016 |
| KR | 101724230 B1 | 4/2017 |

OTHER PUBLICATIONS

Xu, Cheng, et al., "Graphic Programming System for Robots Based on Event-driven Mechanism", KIAPIZ (MACHINERY), Dec. 31, 2010, 7 pages, vol. 48, No. 553.
International Searching Authority, International Search Report (ISR) and Written Opinion for International Application No. PCT/CN2017/084533, dated Feb. 14, 2018, 8 pages, State Intellectual Property Office of the P.R.C., China.
First Office Action of corresponding Chinese patent application (Application No. 201780000333.6), dated Mar. 24, 2020, (13 pages).
Extended European Search Report of corresponding European patent application (Application No. 17909810.8), dated Jan. 13, 2020, (9 pages), European Patent Office, Munich, Germany.
Kirkemyr, Jonas. "End User Programming for TILES: Methods and Tools," Jun. 30, 2016, (166 pages). Retrieved from https://ntnuopen.ntnu.no/ntnu-xmlui/bistream/handle/11250/2406941/15536_FULLTEXT.pdf?sequence=1&isAllowed=y [retrieved on Dec. 17, 2019].
Anonymous: "Define Blocks | Blockly | Google Developers", Sep. 20, 2016, (29 pages). Retrieved from http://web.archive.org/web/20160920203545/https://developers.google.com/blockly/guides/create-custom-blocks/define-blocks [retrieved on Apr. 9, 2020].
Anonymous: "Generating Code | Blockly | Google Developers", Sep. 20, 2016, (4 pages). Retrieved from http://web.archive.org/web/20160920221726/https://developers.google.com/blockly/guides/create-custom-blocks/generating-code [retrieved on Apr. 9, 2020].
Passault, Gregoire et al. "Metabot: A Low-Cost Legged Robotics Platform for Education," 2016 International Conference on Autonomous Robot Systems and Competitions (ICARSC), IEEE, May 4, 2016, pp. 283-287, DOI: 10.1109/ICARSC.2016.52.
Second Office Action of corresponding Chinese patent application (Application No. 201780000333.6), dated Aug. 13, 2020, (15 pages).

* cited by examiner

METHOD AND APPARATUS FOR CONVERTING BUILDING BLOCK PROGRAMMING INTO PROGRAM CODE

CROSS-REFERENCE TO RELATED APPLICATIONS

This application is a National Stage of International Application No. PCT/CN2017/084533, filed on May 16, 2017, which is hereby incorporated by reference in its entirety.

BACKGROUND

Technical Field

The present invention belongs to the technical field of computers and particularly relates to a method and apparatus for converting building block programming into a program code.

Description of Related Art

Building block programming is a programming form, and a user may write a self-program such as Scratch and Blockly by only selecting and combining a series of statements "building blocks" provided by a system instead of memorizing or writing program codes. In the prior art, generally, the building block programming is converted into program codes according to a built-in rule set up in advance by a developer of the building blocks and cannot be revised so as not to be applied to different electronic modules.

BRIEF SUMMARY

On this account, the embodiment of the present invention provides a method and apparatus for converting building block programming into a program code in order to solve the problem that the building block programming cannot be applied to different electronic modules in the prior art.

The first aspect of the embodiment of the present invention provides a method for converting building block programming into a program code, comprising:

setting up building blocks including input parameters, wherein the building blocks mean statement units in the building block programming;

setting up a configuration file for converting the building blocks into program codes, wherein the configuration file comprises a plurality of code regions and subprogram codes respectively set up in the plurality of code regions; and converting the building blocks into corresponding program codes according to the subprogram codes and the input parameters respectively set up in the plurality of code regions.

The second aspect of the embodiment of the present invention provides an apparatus for converting building block programming into a program code, comprising:

a building block setup module for setting up building blocks including input parameters, wherein the building blocks mean statement units in the building block programming;

a file setup module for setting up a configuration file for converting the building blocks into program codes, wherein the configuration file comprises a plurality of code regions and subprogram codes respectively set up in the plurality of code regions; and a code conversion module for converting the building blocks into corresponding program codes according to the subprogram codes and the input parameters respectively set up in the plurality of code regions.

The third aspect of the embodiment of the present invention provides an apparatus for converting building block programming into a program code, comprising a memory, a processor and a computer program stored in the memory and capable of operating on the processor, and steps of the method of the first aspect are implemented when the computer program is executed by the processor.

The fourth aspect of the embodiment of the present invention provides a computer-readable storage medium in which the computer program is stored, and the steps of the method of the first aspect are implemented when the computer program is executed by the processor.

Compared with the prior art, the embodiment of the present invention has the beneficial effects: the building blocks including the input parameters are set up firstly, then, the configuration file for converting the building blocks into the program codes is set up, and next, the building blocks are converted into the corresponding program codes according to the subprogram codes and the input parameters respectively set up in the plurality of code regions in the configuration file. According to the embodiment of the present invention, the configuration file for converting the building blocks into the program codes is set up, and the building blocks may be converted into the corresponding program codes according to the configuration file and the input parameters of the building blocks, so that the electronic modules are controlled according to the program codes. That is, the building blocks may be converted into different program codes by setting up different configuration files and/or input parameters of the building blocks, so that the different electronic modules are controlled according to the different program codes, the aim of applying the building block programming to the different electronic modules is achieved, and the problem that the building block programming cannot be applied to the different electronic modules in the prior art is effectively solved.

BRIEF DESCRIPTION OF THE FIGURES

In order to more clearly describe the technical solution in the embodiment of the present invention, the accompanying drawings to be used in the embodiment or the description in the prior art are simply introduced below, it is apparent that the accompanying drawings described below are only some embodiments of the present invention, and other accompanying drawings may also be achieved by the ordinary skilled in the art according to the accompanying drawings on the premise that no creative labor is provided.

DETAILED DESCRIPTION OF VARIOUS EMBODIMENTS

In the following description, specific details such as specific system structures and technologies are proposed for description instead of limitation, so that the embodiments of the present invention are thoroughly understood. However, it should be apparent to the skilled in the art that the present invention may also be implemented in other embodiments without the specific details. In other instances, the detailed descriptions of well-known systems, apparatuses, circuits and methods are omitted to prevent unnecessary details from obstructing the description of the present invention.

In order to describe the technical solution of the present invention, specific embodiments are described below.

Figures 1, 2:
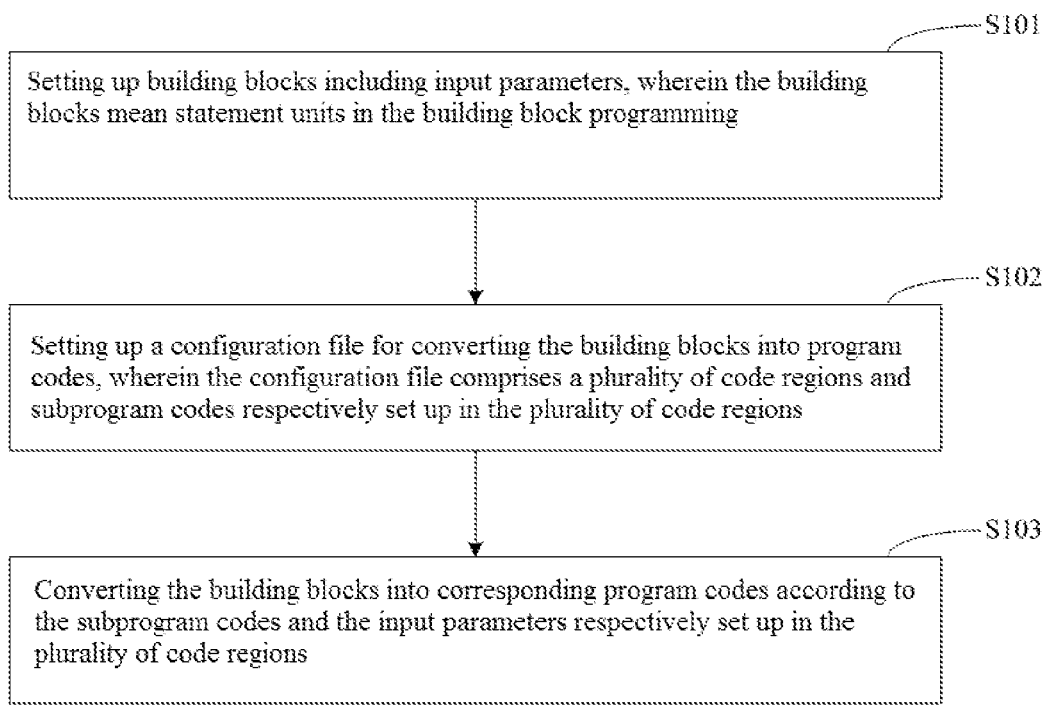
FIG. 1 is a schematic diagram of an implementation flow process of a method for converting building block programming into a program code, provided by an embodiment of the present invention.
FIG. 2 is an exemplary illustration of a building block of which the input parameter is "1"

Refer to FIG. 1 which is a schematic diagram of implementation of a method for converting building block programming into a program code, provided by an embodiment 1 of the present invention, as shown in the figure, the method may comprise the following steps:

step S101, building blocks including input parameters are set up, wherein the building blocks mean statement units in the building block programming.

In the embodiment of the present invention, the input parameters may mean parameters that the building blocks control the corresponding electronic modules to achieve different functions. FIG. 2 shows a building block of which the input parameter is "1", and the building block may control a motor (namely an electronic module) to rotate at a motor port 1 at the speed of 1000 circles per minute. The electronic module comprises a sensor and an executor and is used to be matched with a microprocessor to rapidly construct prototype or creative works, and a typical electronic module comprises a button, a liquid crystal screen, a motor and the like.

Step S102, a configuration file for converting the building blocks into program codes is set up, wherein the configuration file comprises a plurality of code regions and subprogram codes respectively set up in the plurality of code regions.

In the embodiment of the present invention, the configuration file is used for specifying the building blocks contained in an extension and a form that the building blocks are converted into the program codes, namely the configuration file includes, but is not limited to the plurality of code regions and the subprogram codes respectively set up in the plurality of code regions. The extension is capable of increasing an additional programming "building block" for the building block programming, (namely the same building block may achieve different functions by extension) so that more electronic modules are used.

Preferably, the plurality of code regions include an inc region, a def region, a setup region, a loop region and a work region; the subprogram codes respectively set up in the plurality of code regions include:

a subprogram code in a code introduction phase and set up in the inc region;

a subprogram code in a definition phase and set up in the def region;

a subprogram code in an initialization phase and set up in the setup region;

a subprogram code in a loop phase and set up in the loop region; and a subprogram code executed when the building blocks are called and set up in the work region.

In the embodiment of the present invention, a code in the code "introduction" phase may be set up in the "inc" region and includes, but is not limited to a head file required to be additionally referenced; the code in the "definition" phase may be set up in the "def" region and includes, but is not limited to variables and functions required to be additionally defined; the code in the "initialization" phase may be set up in the "setup" region and includes, but is not limited to an initialization code firstly executed by an embedded program; the code in the "loop" phase may be set up in the "loop" region and includes, but is not limited to a code operated every time in the main loop of the embedded program; and the code executed when the building blocks are called is set up in the "work" region and is called during every-time execution of the building blocks. It should be explained that the aims of achieving different functions, controlling different electronic modules and/or converting the building block programming into the program codes with different language forms by the building blocks may be achieved by setting up the different code regions and/or setting up the different subprogram codes in the code regions and the like.

The code phase means a location of a specific code of the microprocessor in a source program, for example, "# include" is in an introduction (include) phase, "pinMode (13,OUTPUT)" is in the initialization (setup) phase and the like. The program codes mean source codes based on certain programming languages (such as C++ and Java).

Step S103, the building blocks are converted into corresponding program codes according to the subprogram codes and the input parameters respectively set up in the plurality of code regions.

Alternatively, converting the building blocks into the corresponding program codes according to the subprogram codes and the input parameters respectively set up in the plurality of code regions comprises:

the subprogram codes respectively set up in the plurality of code regions are combined according to the subprogram codes and the input parameters respectively set up in the plurality of code regions, and the input parameters are brought into the program codes converted from the building blocks, wherein the combined program codes serve as the program codes converted from the building blocks.

Exemplarily, the configuration file for converting the building blocks into the program codes may be set up as follows:

```
{"encode":"{d0}{d1}",
"setup":"attachInterrupt (Encoder_{0} . getIntNum ( ),
isr_process_encoder {0} , RISING) ; \n
Encoder_{0} . setPulse (9) ; \n
Encoder_{0} . setRatio (39 . 267) ; \n
Encoder_{0} . setPosPid (1 . 8 , 0 , 1 .2 ) ; \n
Encoder_{0} . setSpeedPid (0 . 18 , 0 , 0 ) ; \n \ n",
"inc":"#includeh>",
"def":"EncoderMotor Encoder_{0}",
"work":"Encoder_{0}. runSpeed ({1}) ; \n",
"loop":"Encoder_{0}. loop ( ) ; \n"
```

}, the program codes converted from the building blocks in the example according to the subprogram codes and the input parameter "1" respectively set up in the plurality of code regions are as follow:

```
#includeh>
EncoderMotor Encoder_1 ;
void setup( ) {
attachInterrupt (Encoder_1 . getIntNum ( ) ,
isr_process_encoder 1 , RISING) ;
Encoder_1 . setPulse (9) ;
Encoder_1 . setRatio (39 . 267) ;
Encoder_1 . setPosPid (1 . 8 , 0 , 1 .2 ) ;
Encoder_1 . setSpeedPid (0 . 18 , 0 , 0 ) ;
}Void loop( ) {
Encoder_1. loop ( ) ;
```

} when the building blocks are converted into the corresponding program codes, parameters included in the building blocks may be converted into parameters with corresponding data types according to a type definition in the configuration file (for example, d represents for an integer type, and s represents for a character string type) and may be converted into appointed parts of the codes by placeholder replacement. For example, the "motor port" in the "building block" in FIG. 2 is filled with "1", the type of a first parameter may be determined as an integer (d) from the definition type ("encode":"{d0} {d1}") in the example, Encoder_{0} in the definition (namely"Encoder_{0}. loop ( ); \n") of the configuration file is converted into Encoder_1 by the converted codes (namely Encoder_1. loop ( )), that is because the port filled in the building block by a user is "1".

Alternatively, after the building blocks are converted into the corresponding program codes, the method further comprises:

the program codes converted from the building blocks are executed to control corresponding electronic modules.

Figure 3:
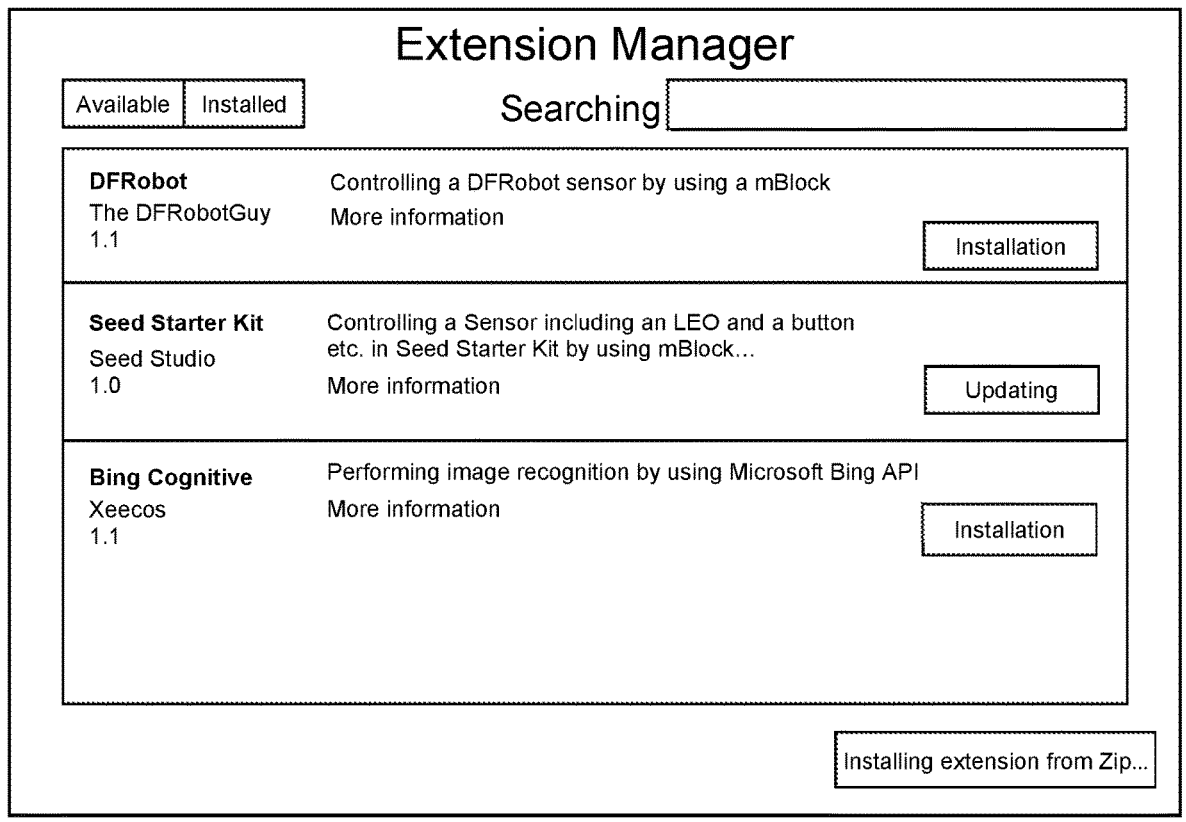
FIG. 3 is an exemplary illustration of a practical application scene of the method for converting building block programming into a program code.

As shown in FIG. 3, in the practical application scene of the method for converting building block programming into a program code, an extension manager is started, and the extension is introduced by options "installation" and "installation from a Zip file" in the extension manager, so that the building block additionally provided by appending extension is used. That is, the building blocks are converted into the corresponding program codes according to the configuration file and the input parameters, and the corresponding electronic modules are controlled. The option "installation" is used for downloading the extension by an online server of building block programming software and is added into a corresponding computer device. The Zip file is a compressed file.

That is, the building blocks may be converted into different program codes by setting up different configuration files and/or input parameters of the building blocks, so that the different electronic modules are controlled according to the different program codes, the aim of applying the building block programming to the different electronic modules is achieved, and the problem that the building block programming cannot be applied to the different electronic modules in the prior art is effectively solved.

Figure 4:
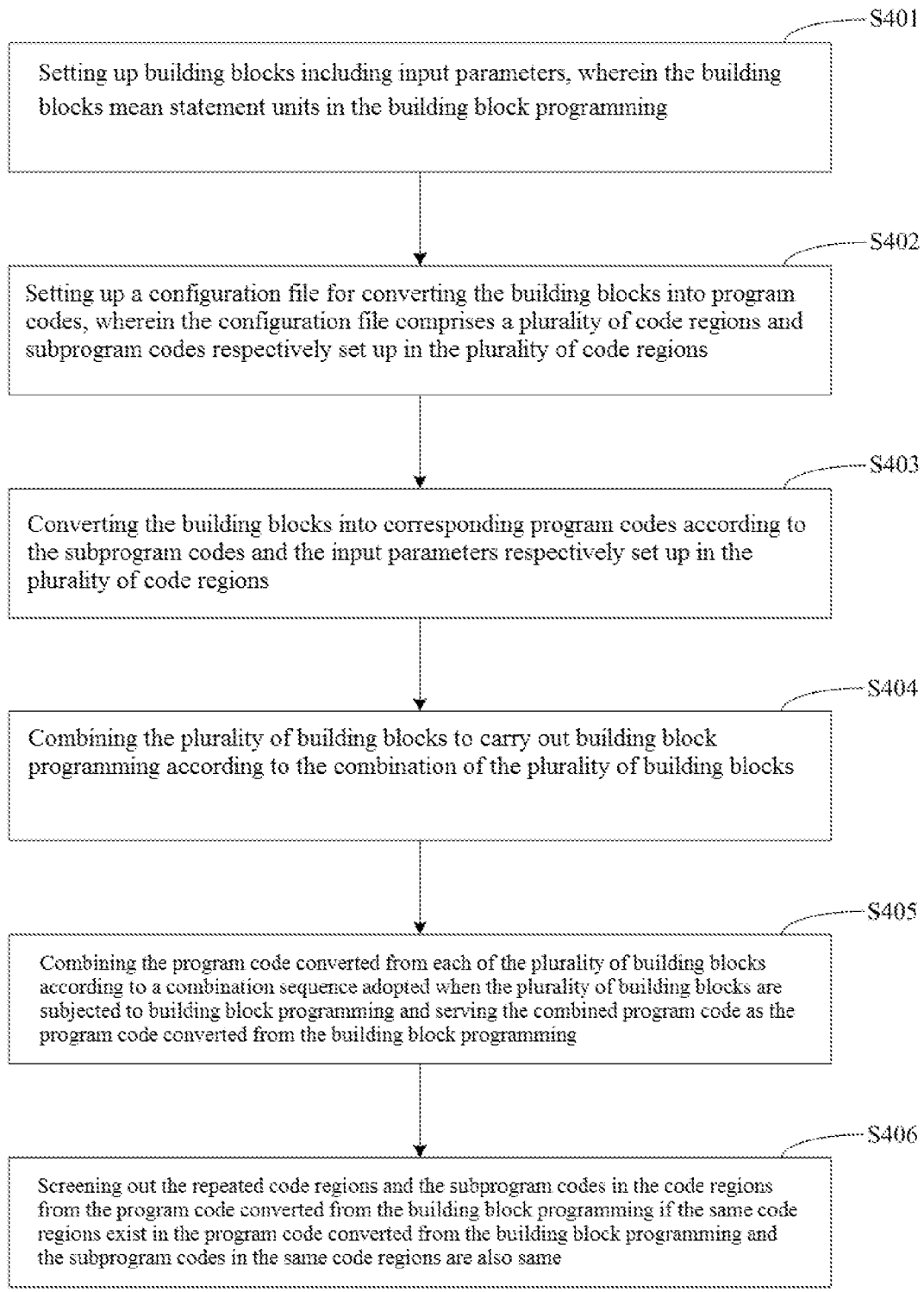
FIG. 4 is a schematic diagram of an implementation flow process of the method for converting building block programming into a program code, provided by the embodiment of the present invention.

Refer to FIG. 4 which is a schematic diagram of implementation of a method for converting building block programming into a program code, provided by an embodiment 2 of the present invention. As shown in the figure, the method may comprise the following steps:

step S401, building blocks including input parameters are set up, wherein the building blocks mean statement units in the building block programming.

The step is same as the step S101 and may refer to the related description of the step S101 for details, and no detailed description is repeated herein.

Step S402, a configuration file for converting the building blocks into program codes is set up, wherein the configuration file comprises a plurality of code regions and subprogram codes respectively set up in the plurality of code regions.

The step is same as the step S102 and may refer to the related description of the step S102 for details, and no detailed description is repeated herein.

Step S403, the building blocks are converted into the corresponding program codes according to the subprogram codes and the input parameters respectively set up in the plurality of code regions.

The step is same as the step S103 and may refer to the related description of the step S103 for details, and no detailed description is repeated herein.

Step S404, the plurality of building blocks are combined to carry out building block programming according to the combination of the plurality of building blocks.

In the embodiment of the present invention, the plurality of building blocks may be combined to control the plurality of electronic modules (one electronic module is controlled by one building block) to achieve different functions, for example, when a kitten is controlled, a building block 1 and a building block 2 may be combined by "moving the building block 1 for 10 steps and rotating the building block 2 rightwards for 15 DEG" so as to control the kitten to move for 10 steps and rotate rightwards for 15 DEG.

Step S405, the program code converted from each of the plurality of building blocks is combined according to a combination sequence adopted when the plurality of building blocks are subjected to building block programming, and the combined program code serves as the program code converted from the building block programming.

For example, when the building block 1 and the building block 2 are combined by "moving the building block 1 for 10 steps and rotating the building block 2 rightwards for 15 DEG", if the building block 1 is arranged in front of the building block 2, when the program code converted from the building block 1 and the program code converted from the building block 2 according to steps S401-S403 are combined, the program code converted from the building block 1 is also arranged in front of the program code converted from the building block 2, and the program codes are combined according to this sequence (namely the program code converted from the building block 1 is arranged in front of the program code converted from the building block 2), the combined program code is used as the program code converted from the building block programming of a combination of the building block 1 and the building block 2, so that the kitten is controlled to firstly move for 10 steps and then rotate rightwards for 15 DEG Step S406, the repeated code regions and the subprogram codes in the code regions are screened out from the program code converted from the building block programming if the same code regions exist in the program code converted from the building block programming and the subprogram codes in the same code regions are also same.

In the embodiment of the present invention, the program code converted from each building block generally at least comprises a plurality of code regions such as the inc region, the def region, the setup region, the loop region and a work region, and therefore, the repeated code regions and the subprogram codes in the code regions are screened out from the program code converted from the building block programming if the same code regions exist in the program code converted from the building block programming and the subprogram codes in the same code regions are also same. For example, for the inc region, the repeated head files are screened out; for the def region, the repeated definitions are screened out; for the setup region, the repeated initialization codes are screened out; and for the loop region, the repeated operating codes are screened out.

Exemplarily, the program code converted from the building block 1 includes # includeh>, the program code converted from the building block 2 also includes # includeh>, and therefore, when the building block 1 and the building block 2 are subjected to building block programming, the # includeh> in the program code converted from the building block 2 may be screened out from the program code converted from the building block programming, while the # includeh> in the program code converted from the building block 1 is only retained as the head file of the program code converted from the building block programming.

In the embodiment of the present invention, based on embodiment 1, it is further added with a step that when the building block programming is executed according to the combination of a couple of building blocks, shifting out the subprogram codes in the repeated code area in the procedure of program code converting, so that the repeated execution of same subprogram codes can be effectively avoided.

It should be understood that the serial number of each step in the embodiment is not intended to represent for the execution sequence, and the execution sequence of each process should be determined according to the function and internal logic of the process, but should not be constructed as any limitations to the execution process of the embodiment of the present invention.

Figure 5:
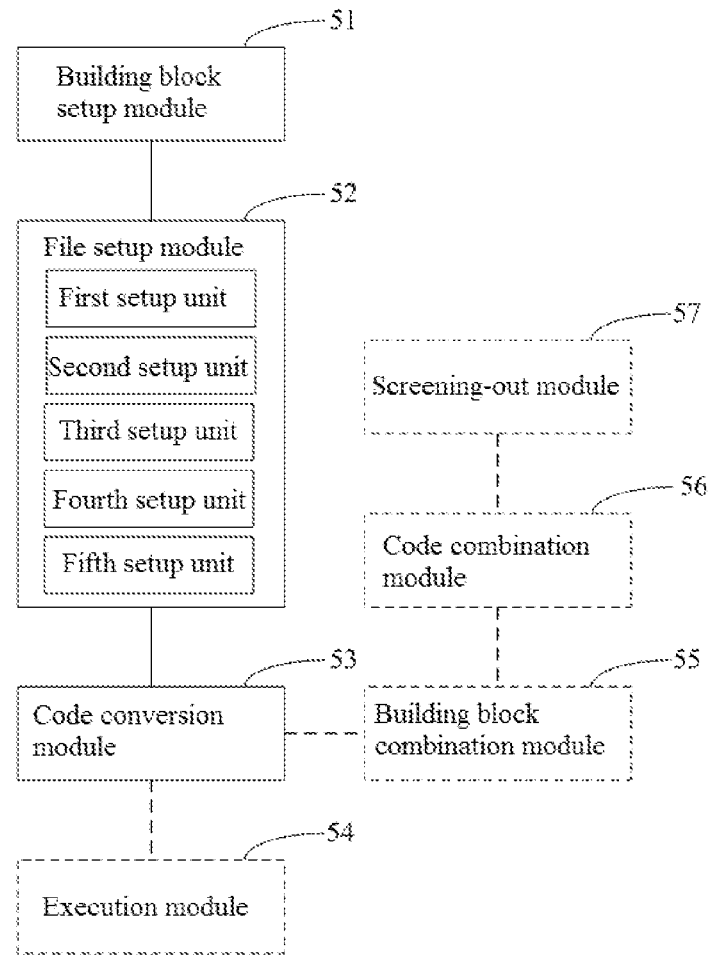
FIG. 5 is a schematic diagram of an apparatus for converting building block programming into a program code, provided by an embodiment of the present invention.

Refer to FIG. 5 which is a schematic diagram of a apparatus for converting building block programming into a program code, provided by an embodiment 3 of the present invention, and parts relevant to the embodiment of the present invention are only shown for facilitating description.

The apparatus for converting building block programming into a program code comprises:

a building block setup module 51 for setting up building blocks including input parameters, wherein the building blocks mean statement units in the building block programming;

a file setup module 52 for setting up a configuration file for converting the building blocks into program codes, wherein the configuration file comprises a plurality of code regions and subprogram codes respectively set up in the plurality of code regions; and a code conversion module 53 for converting the building blocks into corresponding program codes according to the subprogram codes and the input parameters respectively set up in the plurality of code regions.

Alternatively, the plurality of code regions include an inc region, a def region, a setup region, a loop region and a work region; the file setup module 52 comprises:

a first setup unit 521 for setting up a subprogram code in a code introduction phase in the inc region;

a second setup unit 522 for setting up a subprogram code in a definition phase in the def region;

a third setup unit 523 for setting up a subprogram code in an initialization phase in the setup region;

a fourth setup unit 524 for setting up a subprogram code in a loop phase in the loop region; and a fifth setup unit 525 for setting up a subprogram code executed when the building blocks are called in the work region.

The apparatus further comprises:

an execution module 54 for executing the program codes converted from the building blocks to control corresponding electronic modules after the building blocks are converted into the corresponding program codes;

the code conversion module 53 is specifically used for combining subprogram codes respectively set up in the plurality of code regions according to the subprogram codes and the input parameters respectively set up in the plurality of code regions and bringing the input parameters into the program codes converted from the building blocks, wherein the combined program codes serve as the program codes converted from the building blocks;

the apparatus further comprises:

a building block combination module 55 for combining the plurality of building blocks to carry out building block programming according to the combination of the plurality of building blocks;

a code combination module 56 for combining the program code converted from each of the plurality of building blocks according to a combination sequence adopted when the plurality of building blocks are subjected to building block programming and serving the combined program code as the program code converted from the building block programming; and a screening-out module 57 for screening out the repeated code regions and the subprogram codes in the code regions from the program code converted from the building block programming if the same code regions exist in the program code converted from the building block programming and the subprogram codes in the same code regions are also same.

It can be clearly known by the skilled in the art that the division of each of the above functional units and modules is illustrated for convenient and simple description, and in actual applications, the above function allocation may be completed by different functional units and modules as required, namely an internal structure of the apparatus is divided into different functional units or modules to complete all or parts of the functions described above. Each of the functional units and modules in the embodiment may be integrated in one processing unit, or each unit independently and physically exists, or two or more units are integrated into one unit, the integrated unit may be implemented in a hardware form or a software functional unit form. In addition, the specific name of each of the functional units and modules is only intended to facilitate distinguishing from each other, rather than to limit the scope of the application. The specific working processes of the units and modules in the system may refer to corresponding process in the embodiment of the above method, and no detailed description is repeated herein.

Figure 6:
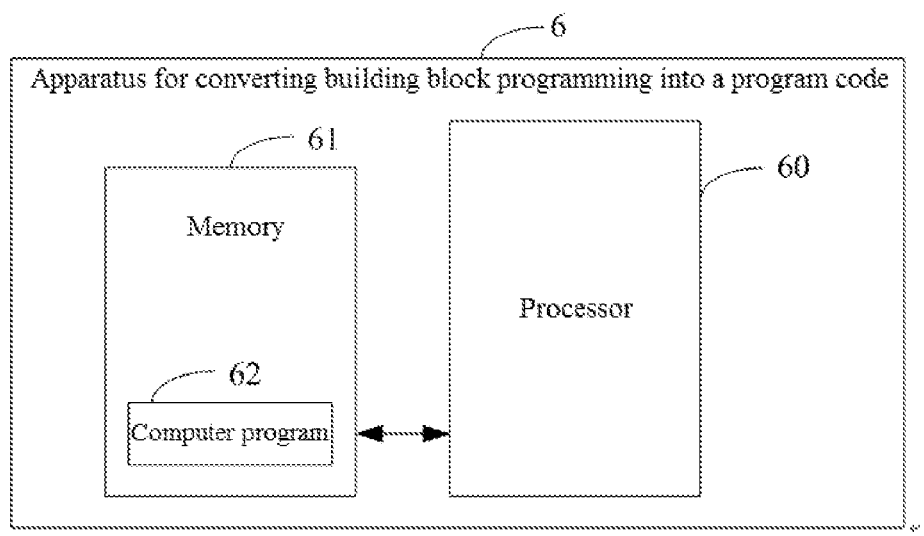
FIG. 6 is a schematic diagram of an apparatus for converting building block programming into a program code, provided by an embodiment of the present invention.

Refer to FIG. 6 which is a schematic diagram of an apparatus for converting building block programming into a program code, provided by an embodiment 4 of the present invention. As shown in FIG. 6, the apparatus for converting building block programming into a program code in the embodiment comprises: a processor 60, a memory 61 and a computer program 62 stored in the memory 61 and capable of operating on the processor 60. The steps such as steps S101-S104 as shown in FIG. 1 and steps S401-S406 as shown in FIG. 4 in each embodiment of the method for converting building block programming into a program code are implemented when the computer program 62 is executed by the processor 60. Or, functions of each module/unit such as functions of the modules 51-57 as shown in FIG. 5 in each embodiment of the apparatus is implemented when the computer program 62 is executed by the processor 60.

Exemplarily, the computer program 62 may be divided into one or more modules/units, and the one or more modules/units are stored in the memory 61 and are executed by the processor 60 so as to complete the present invention. The one or more modules/units may be a series of computer program instruction segments capable of completing specific functions, and the instruction segments are used for describing the execution process of the computer program 62 in the apparatus for converting building block programming into a program code. For example, the computer program 62 may be divided into a building block setup module, a file setup module, a code conversion module, an execution module, a building block combination module, a code combination module and a screening-out module, and the specific function of each module is as follows:

the building block setup module is used for setting up building blocks including input parameters, wherein the building blocks mean statement units in the building block programming;

the file setup module is used for setting up a configuration file for converting the building blocks into program codes, wherein the configuration file comprises a plurality of code regions and subprogram codes respectively set up in the plurality of code regions; and the code conversion module is used for converting the building blocks into corresponding program codes according to the subprogram codes and the input parameters respectively set up in the plurality of code regions.

The plurality of code regions include an inc region, a def region, a setup region, a loop region and a work region; the file setup module comprises:

a first setup unit for setting up a subprogram code in a code introduction phase in the inc region;

a second setup unit for setting up a subprogram code in a definition phase in the def region;

a third setup unit for setting up a subprogram code in an initialization phase in the setup region;

a fourth setup unit for setting up a subprogram code in a loop phase in the loop region; and a fifth setup unit for setting up a subprogram code executed when the building blocks are called in the work region.

The execution module is used for executing the program codes converted from the building blocks to control corresponding electronic modules after the building blocks are converted into the corresponding program codes;

the code conversion module is specifically used for combining subprogram codes respectively set up in the plurality of code regions according to the subprogram codes and the input parameters respectively set up in the plurality of code regions and bringing the input parameters into the program codes converted from the building blocks, wherein the combined program codes serve as the program codes converted from the building blocks;

the building block combination module is used for combining the plurality of building blocks to carry out building block programming according to the combination of the plurality of building blocks;

the code combination module is used for combining the program code converted from each of the plurality of building blocks according to a combination sequence adopted when the plurality of building blocks are subjected to building block programming and serving the combined program code as the program code converted from the building block programming; and the screening-out module is used for screening out the repeated code regions and the subprogram codes in the code regions from the program code converted from the building block programming if the same code regions exist in the program code converted from the building block programming and the subprogram codes in the same code regions are also same.

The apparatus 6 for converting building block programming into a program code may be a computer device such as a desktop computer, a notebook computer, a palmtop computer and a cloud server. The apparatus for converting building block programming into a program code may include, but is not limited to the processor 60 and the memory 61. It can be understood by the people skilled in the art that FIG. 6 is only an example of the apparatus 6 for converting building block programming into a program code, but should not be constructed as any limitations to the apparatus for converting building block programming into a program code, the apparatus 6 for converting building block programming into a program code may comprise more or less components than the illustration, or a combination of certain components or different components, such as an input/output device, a network access device and a bus.

The processor 60 may be a central processing unit (CPU) or any other general processor, a digital signal processor (DSP), an application specific integrated circuit (ASIC), a field-programmable gate array (FPGA) or any other programmable logic device, a discrete gate or transistor logic device, a discrete hardware component and the like. The general processor may be a microprocessor or any conventional processor and the like.

The memory 61 may be an internal storage unit of apparatus 6 which includes program codes converted from the building block programming, such as a hard disk or an internal memory of the apparatus 6 for converting building block programming into a program code. The memory 61 may also be an external storage device of the apparatus 6 for converting building block programming into a program code, such as a spliced hard disk, a smart media card (SMC), a secure digital (SD) card and a flash card arranged on the apparatus 6 for converting building block programming into a program code. Further, the memory 61 may not only comprise the internal storage unit and the external storage device of the apparatus 6 for converting building block programming into a program code. The memory 61 is used for storing the computer program and other programs and data required by the apparatus for converting building block programming into a program code. The memory 61 may also be used for temporarily storing data which have been output or are to be output.

It can be clearly known by the people skilled in the art that the division of each of the above functional units and modules is illustrated for convenient and simple description, and in actual applications, the above function allocation may be completed by different functional units and modules as required, namely an internal structure of the apparatus is divided into different functional units or modules to complete all or parts of the functions described above. Each of the functional units and modules in the embodiment may be integrated in one processing unit, or each unit independently and physically exists, or two or more units are integrated into one unit, the integrated unit not only may be implemented in a hardware form or a software functional unit form. In addition, the specific name of each of the functional units and modules is only intended to facilitate distinguishing from each other, rather than limiting the scope of the application. The specific working processes of the units and modules in the system may refer to corresponding process in the embodiment of the above method, and no detailed description is repeated herein.

In the embodiments, the description of each embodiment focuses on different aspects, and parts not described or recorded in details in a certain embodiment may refer to relevant descriptions of other embodiments.

It can be recognized by the ordinary people skilled in the art that the units and algorithm steps of each example described in combination with the embodiments disclosed herein may be implemented by using electronic hardware or combining computer software with the electronic hardware. Whether the functions are executed in a hardware form or a software form depends on particular applications and design constraint conditions of a technical solution. Skilled artisans may implement the described functions for each particular application by using different methods; however, the implementation should not be regarded to exceed the scope of the present invention.

In the embodiments provided by the present invention, it should be understood that the disclosed apparatus and method may be implemented in other forms. For example, the embodiment of the apparatus/terminal device described above is only illustrative, for example, the division of the modules or units is only logic functional division, and the modules or units may be divided in other forms during actual implementation, for example, a plurality of units or components may be combined or integrated into the other system, or some features may be ignored or not be executed. On the other hand, the shown or discussed coupling or direct coupling or communication connection therebetween may be indirect coupling or communication connection realized by virtue of some interfaces, apparatuses or units and may be electrical, mechanical or in other forms.

The units described as separating components may be or not be physically separated, the components shown as the units may be or not be physical units and not only may be located in the same place, but also may be distributed on a plurality of network units. Parts or all of the units may be selected according to actual demands to achieve the aim of the solution of the embodiment.

In addition, each functional unit in each embodiment of the present invention may be integrated into one processing unit, or each unit independently and physically exists, or two or more units are integrated into one unit. The integrated unit may be implemented in a hardware form or a software functional unit form.

The integrated module/unit may be stored in a computer-readable storage medium if being implemented in the software functional unit form and being used as an independent product to be sold or used. Based on this understanding, all or parts of processes in the method in the embodiment may also be completed by virtue of relevant hardware commanded by the computer program, the computer program may be stored in a computer-readable storage medium, and the steps in each embodiment of the method may be implemented when the computer program is executed by the processor. The computer program includes a computer program code which may be in a source code form, an object code form, an executable file form or some intermediate forms and the like. The computer-readable storage medium may include any one of an entity or apparatus, a recording medium, a U disk, a mobile hard disk, a diskette, an optical disk, a computer memory, a read-only memory (ROM), a random access memory (RAM), an electric carrier signal, a telecommunication signal, a software distribution medium and the like capable of carrying the computer program code. It should be explained that the content included by the computer-readable storage medium may be appropriately increased or reduced according to the requirements of legislation and patent practices in jurisdictions, for example, the computer-readable storage medium does not include the electric carrier signal and the telecommunication signal according to the legislation and patent practices in some jurisdictions.

The above embodiments are only intended to explain the technical solution of the present invention, rather than to limit the technical solution; although the present invention is described in details by reference to the former embodiments, it should be understood by the ordinary skilled in the art that the technical solution recorded by each of the former embodiments may be modified, or parts of technical features thereof may be equivalently replaced; and the modifications or replacements do not make the essences of corresponding technical solutions depart from the spirit and scope of the technical solution of each embodiment of the present invention and should fall into the scope of the present invention.

The invention claimed is:

1. A method for converting building block programming into program codes, comprising:
   setting up building blocks including input parameters, wherein the building blocks mean statement units in the building block programming;
   setting up a plurality of configuration files for converting the building blocks into said program codes, wherein each said configuration file comprises a plurality of code regions and subprogram codes respectively set up in the plurality of code regions;
   converting the building blocks into corresponding program codes according to the subprogram codes of one of said plurality of configuration files and the input parameters respectively set up in the plurality of code regions;
   combining the plurality of building blocks to carry out building block programming according to the combination of the plurality of building blocks;
   combining the program code converted from each of the plurality of building blocks according to a combination sequence adopted when the plurality of building blocks are subjected to building block programming, and serving the combined program code as the program code converted from the building block programming; and
   screening out the repeated code regions and the subprogram codes in the code regions from the program code converted from the building block programming if the same code regions exist in the program code converted from the building block programming and the subprogram codes in the same code regions are also the same,
   wherein, said program codes converted from same one of the building blocks according to the subprogram codes of different of said configuration files are respectively used to control different electronic devices.

2. The method of claim 1, wherein the plurality of code regions include an introduction region, a definition region, a setup region, a loop region and a work region; and the subprogram codes respectively set up in the plurality of code regions include:
   a subprogram code in a code introduction phase and set up in the introduction region;
   a subprogram code in a definition phase and set up in the definition region;
   a subprogram code in an initialization phase and set up in the setup region;

a subprogram code in a loop phase and set up in the loop region; and a subprogram code executed when the building blocks are called and set up in the work region.

3. The method of claim 1, wherein, after the building blocks are converted into the corresponding program codes, further comprising:

executing the program codes converted from the building blocks according to the subprogram codes of each of said one of said plurality of configuration files, to control corresponding one of said electronic devices.

4. The method of claim 1, wherein converting the building blocks into corresponding program codes according to the subprogram codes and the input parameters respectively set up in the plurality of code regions comprises:

combining the subprogram codes respectively set up in the plurality of code regions according to the subprogram codes and the input parameters respectively set up in the plurality of code regions, and bringing the input parameters into the program codes converted from the building blocks, wherein the combined program codes serve as the program codes converted from the building blocks.

5. The method of claim 1, wherein:

at least one of said electronic devices comprises a sensor and an executor; and/or at least one of said electronic devices is selected from one or more of a button, a liquid crystal screen and a motor.

6. An apparatus for converting building block programming into a program code, comprising a memory, a processor and a computer program stored in the memory and capable of operating on the processor, wherein a method for converting building block programming into program codes is implemented when the computer program is executed by the processor, the method comprises:

setting up building blocks including input parameters, wherein the building blocks mean statement units in the building block programming;

setting up a plurality of configuration files for converting the building blocks into said program codes, wherein each said configuration file comprises a plurality of code regions and subprogram codes respectively set up in the plurality of code regions;

converting the building blocks into corresponding program codes according to the subprogram codes of one of said plurality of configuration files and the input parameters respectively set up in the plurality of code regions;

combining the plurality of building blocks to carry out building block programming according to the combination of the plurality of building blocks;

combining the program code converted from each of the plurality of building blocks according to a combination sequence adopted when the plurality of building blocks are subjected to building block programming, and serving the combined program code as the program code converted from the building block programming; and screening out the repeated code regions and the subprogram codes in the code regions from the program code converted from the building block programming if the same code regions exist in the program code converted from the building block programming and the subprogram codes in the same code regions are also the same, wherein, said program codes converted from same one of the building blocks according to the subprogram codes of different of said configuration files are respectively used to control different electronic devices.

7. The apparatus of claim 6, wherein the plurality of code regions include an introduction region, a definition region, a setup region, a loop region and a work region; and the subprogram codes respectively set up in the plurality of code regions include:

a subprogram code in a code introduction phase and set up in the introduction region;

a subprogram code in a definition phase and set up in the definition region;

a subprogram code in an initialization phase and set up in the setup region;

a subprogram code in a loop phase and set up in the loop region; and a subprogram code executed when the building blocks are called and set up in the work region.

8. The apparatus of claim 6, wherein, after the building blocks are converted into the corresponding program codes, the method further comprises:

executing the program codes converted from the building blocks to control corresponding one of said electronic devices.

9. The apparatus of claim 6, wherein in said method, converting the building blocks into corresponding program codes according to the subprogram codes and the input parameters respectively set up in the plurality of code regions comprises:

combining the subprogram codes respectively set up in the plurality of code regions according to the subprogram codes and the input parameters respectively set up in the plurality of code regions, and bringing the input parameters into the program codes converted from the building blocks, wherein the combined program codes serve as the program codes converted from the building blocks.

10. The apparatus of claim 6, wherein:

at least one of said electronic devices comprises a sensor and an executor; and/or at least one of said electronic devices is selected from one or more of a button, a liquid crystal screen and a motor.

11. A non-transitory computer-readable storage medium in which the computer program is stored, wherein a method for converting building block programming into program codes is implemented when the computer program is executed by the processor, the method comprises:

setting up building blocks including input parameters, wherein the building blocks mean statement units in the building block programming;

setting up a plurality of configuration files for converting the building blocks into said program codes, wherein each said configuration file comprises a plurality of code regions and subprogram codes respectively set up in the plurality of code regions;

converting the building blocks into corresponding program codes according to the subprogram codes of one of said plurality of configuration files and the input parameters respectively set up in the plurality of code regions;

combining the plurality of building blocks to carry out building block programming according to the combination of the plurality of building blocks;

combining the program code converted from each of the plurality of building blocks according to a combination sequence adopted when the plurality of building blocks are subjected to building block programming, and serving the combined program code as the program code converted from the building block programming; and screening out the repeated code regions and the subprogram codes in the code regions from the program code converted from the building block programming if the same code regions exist in the program code converted from the building block programming and the subprogram codes in the same code regions are also the same, wherein, said program codes converted from same one of the building blocks according to the subprogram codes of different of said configuration files are respectively used to control different electronic devices.

12. The medium of claim 11, wherein the plurality of code regions include an introduction region, a definition region, a setup region, a loop region and a work region; and the subprogram codes respectively set up in the plurality of code regions include:
   a subprogram code in a code introduction phase and set up in the introduction region;
   a subprogram code in a definition phase and set up in the definition region;
   a subprogram code in an initialization phase and set up in the setup region;
   a subprogram code in a loop phase and set up in the loop region; and
   a subprogram code executed when the building blocks are called and set up in the work region.

13. The medium of claim 11, wherein, after the building blocks are converted into the corresponding program codes, the method further comprises:
   executing the program codes converted from the building blocks to control corresponding one of said electronic devices.

14. The medium of claim 11, wherein in said method, converting the building blocks into corresponding program codes according to the subprogram codes and the input parameters respectively set up in the plurality of code regions comprises:
   combining the subprogram codes respectively set up in the plurality of code regions according to the subprogram codes and the input parameters respectively set up in the plurality of code regions, and bringing the input parameters into the program codes converted from the building blocks, wherein the combined program codes serve as the program codes converted from the building blocks.

15. The medium of claim 11, wherein:
   at least one of said electronic devices comprises a sensor and an executor; and/or
   at least one of said electronic devices is selected from one or more of a button, a liquid crystal screen and a motor.

* * * * *